June 30, 1953 G. E. DATH 2,643,874
FRICTION SHOCK ABSORBER FOR RAILWAY CAR TRUCKS
Filed April 12, 1950
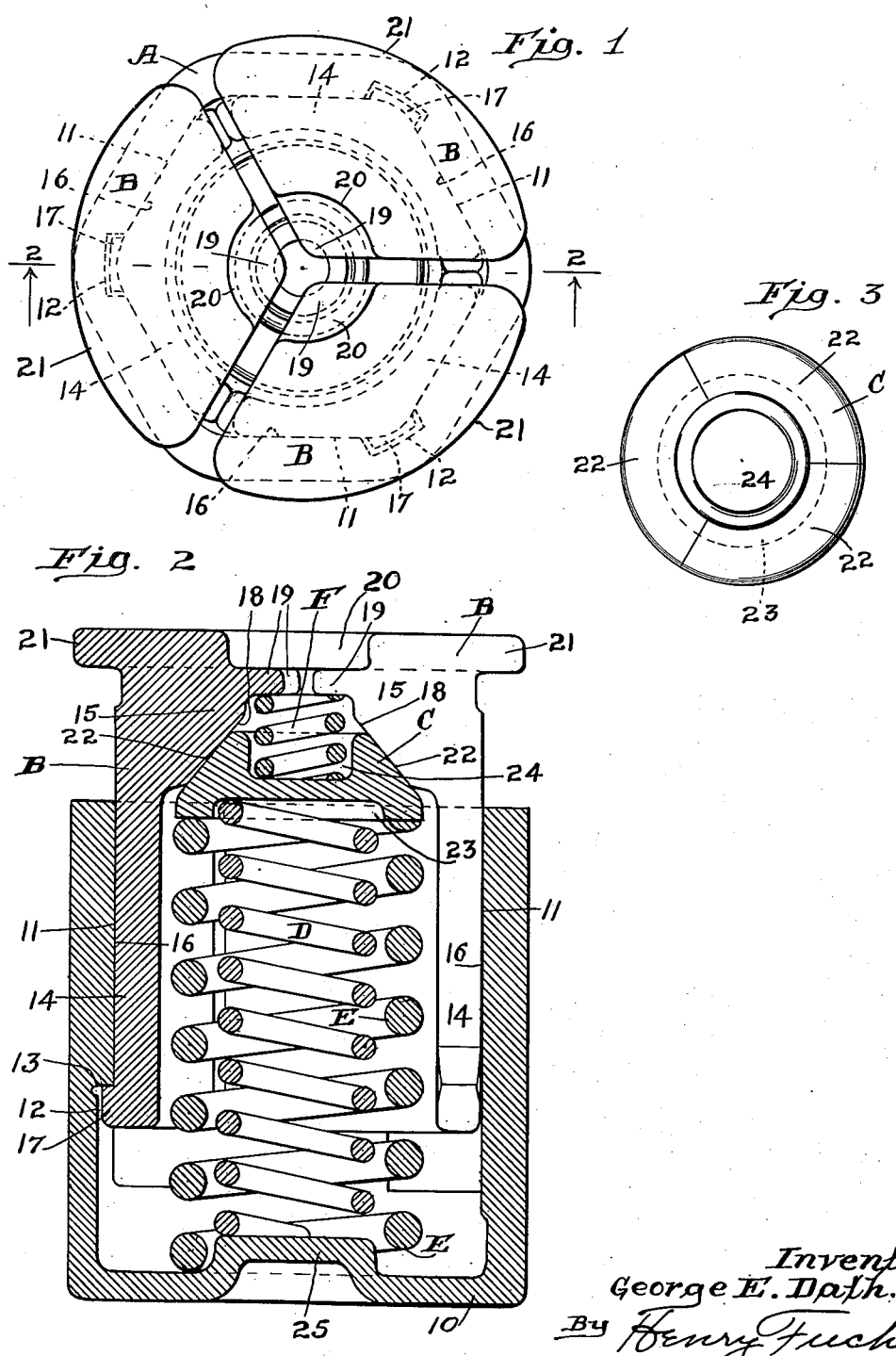
Inventor:
George E. Dath.
By Henry Fuchs
Atty.

Patented June 30, 1953

2,643,874

UNITED STATES PATENT OFFICE 2,643,874

FRICTION SHOCK ABSORBER FOR RAILWAY CAR TRUCKS

George E. Dath, Mokena, Ill., assignor to W. H. Miner, Inc., Chicago, Ill., a corporation of Delaware Application April 12, 1950, Serial No. 155,474

1 Claim. (Cl. 267—9)

This invention relates to improvements in friction shock absorbers for snubbing or dampening the action of railway car truck springs.

One object of the invention is to provide a friction shock absorber, comprising a friction casing, friction shoes slidingly telescoped within the casing, a combined spring follower and wedge member in wedging engagement with the shoes, and spring means within the casing yieldingly opposing inward movement of the combined spring follower and wedge member, wherein additional spring means reacting between the combined spring follower and wedge member and shoes is provided for forcing the shoes and the wedge apart to break the wedging contact therebetween to facilitate release of the mechanism.

Other objects of the invention will more clearly appear from the description and claim hereinafter following.

In the accompanying drawing forming a part of this specification, Figure 1 is a top plan view of my improved friction shock absorber. Figure 2 is a transverse, vertical sectional view, corresponding substantially to the line 2—2 of Figure 1. Figure 3 is a top plan view of the combined spring follower and wedge member of my improved mechanism.

The improved friction shock absorber, as illustrated in the drawing, comprises broadly a friction casing A, three friction shoes B—B—B, a combined spring follower and wedge member C, inner and outer main springs D and E, and a release spring F.

The casing A is in the form of a tubular member of hexagonal, transverse cross section, open at its upper end and closed at its bottom end by a transverse wall 10. The interior of the casing A presents three lengthwise extending friction surfaces 11 of V-shaped, transverse cross section. At alternate corners of the casing, the interior walls are vertically slotted at their lower ends, as indicated at 12. The transverse walls at the upper end of each slot provide a stop shoulder 13 for limiting outward movement of the corresponding shoe B.

The friction shoes B are three in number, arranged symmetrically about the vertical central axis of the mechanism in sliding engagement with the side walls of the casing. Each shoe B comprises an elongated plate 14, having an inwardly enlarged head 15 at its top end. The plate 14 presents a lengthwise extending friction surface 16 on its outer side of V-shaped, transverse cross section engaged with one of the V-shaped surfaces 11 of the casing. At its bottom end, each shoe B is provided with an outwardly projecting stop lug 17 engaged in the corresponding slot 12 of the casing in back of the shoulder 13 at the upper end of said slot. As will be evident, engagement of the stop lug 17 of each shoe with the corresponding shoulder 13 of the casing positively limits outward movement of said shoe. The laterally projecting head 15 of each shoe presents a flat wedge face 18 on its underneath side. The wedge faces 18—18—18 of the three shoes diverge downwardly, as clearly shown in Figure 2. Each shoe has an inwardly projecting, horizontal lip or flange 19 on the inner side of the head 15, located above the wedge face of the shoe. Above the flange 19, the inner side of the shoe is cut out to provide a seat 20 for the usual spring centering projection on the top follower plate of a cluster of railway car truck springs. Each shoe is further provided with a laterally outwardly projecting, horizontal flange 21 at its upper end engageable with the upper end of the casing A to limit compression of the mechanism.

The combined spring follower and wedge member C is in the form of a block having three upwardly converging wedge faces 22—22—22 on the upper side thereof, correspondingly inclined to and engaged with the wedge faces 18—18—18 of the shoes. The member C has a shallow seat 23 at its bottom side for the upper end of the spring D. At its upper side, the member C has a spring pocket 24 in which the lower end of the release spring F is seated. The pocket 24 is relatively deep and of smaller diameter than the seat 23.

The springs D and E are arranged within the casing A between the bottom wall 10 and the combined spring follower and wedge member C. Each spring is in the form of a helical coil. The spring E surrounds the spring D. The spring E has its top end bearing on the bottom side of the member C and its bottom end surrounding a hollow, upstanding centering boss 25 on the wall 10 of the casing A. The boss 25 provides a seat at the bottom end of the casing for the usual spring centering lug of the lower spring plate of the truck spring cluster. The spring D, which is arranged within the spring E, has its upper end engaged in the seat 23 of the member C and its lower end bearing on the boss 25.

The release spring F is also in the form of a helical coil. This spring is interposed between the shoes B—B—B and the member C, having its lower end seated in the pocket 24 of the member C and its upper end abutting the underneath sides of the lips 19—19—19 of the three shoes. The spring F is preferably under a predetermined amount of initial compression and tends to force the shoes B—B—B and the member C apart to facilitate release of the mechanism.

My improved shock absorber replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes B—B—B are forced downwardly with respect to the casing A, against the spring resisted combined spring follower and wedge member C. Due to wedging engagement between the member C and the shoes B—B—B, the latter are pressed into intimate frictional contact with the friction surfaces of the casing A. The frictional resistance thus provided effectively snubs the actions of the truck springs.

Upon recoil of the truck springs and upward movement of the top spring follower plate of the truck spring cluster, the springs D and E return all of the parts to the normal full release position shown in Figure 2, the wedging contact between the member C and the shoes B—B—B being broken by the expansive action of the release spring F, thereby assuring instantaneous release of the mechanism. Outward movement of the shoes B—B—B is positively limited by engagement of the lugs 17—17—17 thereof with the shoulders 13—13—13 of the casing A.

I claim:

In a friction shock absorber, the combination with a friction casing; of a plurality of friction shoes slidingly telescoped within the casing, said shoes having their outer ends projecting beyond the outer end of the casing to receive the actuating force, said shoes having wedge faces thereon, all of said wedge faces of said shoes facing inwardly only; a combined spring follower and wedge member having wedge faces at its outer end in wedging engagement with the wedge faces of said shoes throughout the compression stroke of the mechanism, said member having an upwardly opening spring pocket therein, said shoes having laterally inwardly projecting flanges at their upper ends; spring elements within the casing bearing on said member for yieldingly opposing inward movement of the latter and a release spring under initial compression having one end seated in said pocket and the other end bearing on the flanges of said shoes.

GEORGE E. DATH.

References Cited in the file of this patent

UNITED STATES PATENTS

| Number | Name | Date |
| --- | --- | --- |
| 754,670 | Miner | Mar. 15, 1904 |
| 1,076,749 | Courson | Oct. 28, 1913 |
| 1,555,696 | O'Connor | Sept. 29, 1925 |
| 1,853,932 | Schmidt | Apr. 12, 1932 |
| 2,306,393 | Light | Dec. 29, 1942 |
| 2,413,295 | Dath | Dec. 31, 1946 |
| 2,486,556 | Dath | Nov. 1, 1949 |